United States Patent
Lim

Patent Number: 5,499,054
Date of Patent: Mar. 12, 1996

[54] CHARACTER AND PATTERN MIXING APPARATUS FOR USE IN A VIDEO EQUIPMENT

[75] Inventor: Han-Sub Lim, Incheon, Rep. of Korea

[73] Assignee: Daewoo Electronics Co., Ltd., Seoul, Rep. of Korea

[21] Appl. No.: 366,141

[22] Filed: Dec. 29, 1994

[30] Foreign Application Priority Data

Dec. 29, 1993 [KR] Rep. of Korea ............... 93-31086

[51] Int. Cl.6 .................. H04N 5/262; H04N 5/272; H04N 5/265; H04N 5/445
[52] U.S. Cl. ............ 348/563; 348/511; 348/569; 348/584; 348/589; 348/600; 348/659; 345/141
[58] Field of Search .................. 348/659, 611, 348/525, 554, 563, 564, 569, 584, 589, 600, 689, 598; 345/141, 213; H04N 5/262, 5/272, 5/265, 5/445

[56] References Cited

U.S. PATENT DOCUMENTS

| | | | |
|---|---|---|---|
| 4,450,442 | 5/1984 | Tanaka | 345/213 |
| 4,580,165 | 4/1986 | Patton et al. | 345/213 |
| 5,161,236 | 11/1992 | Nakayama et al. | 348/563 |
| 5,185,603 | 2/1993 | Medin | 345/213 |
| 5,185,665 | 2/1993 | Okura et al. | 348/589 |

*Primary Examiner*—Victor R. Kostak
*Assistant Examiner*—Glenton B. Burgess
*Attorney, Agent, or Firm*—Anderson Kill Olick & Oshinsky

[57] ABSTRACT

A video mixing apparatus for use in a video equipment capable of providing a mixed image luminance signal comprises a synchronization ("sync") separator for providing a horizontal sync, vertical sync and composite sync signals from an input image luminance signal; a character/pattern controller, in response to the horizontal and vertical sync signals, for generating a character luminance and a pattern luminance signals; a character mixer for mixing the composite sync signal with the character luminance signal to produce a mixed character signal; a pattern mixer for mixing the composite sync signal with the pattern luminance signal to produce a mixed pattern signal; and switching apparatus for mixing the mixed character signal and the mixed pattern signal with the image luminance signal to thereby provide the mixed image luminance signal.

1 Claim, 4 Drawing Sheets

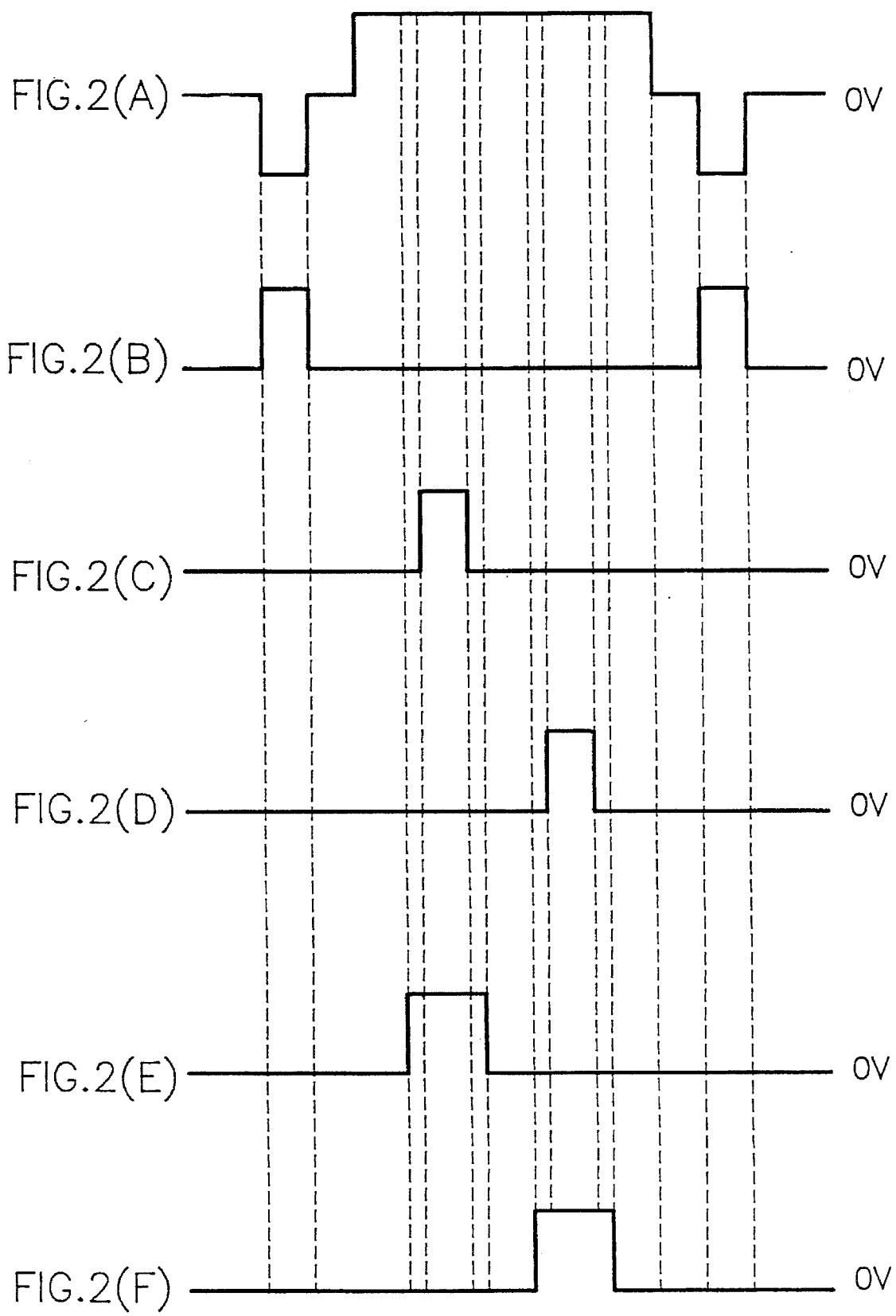

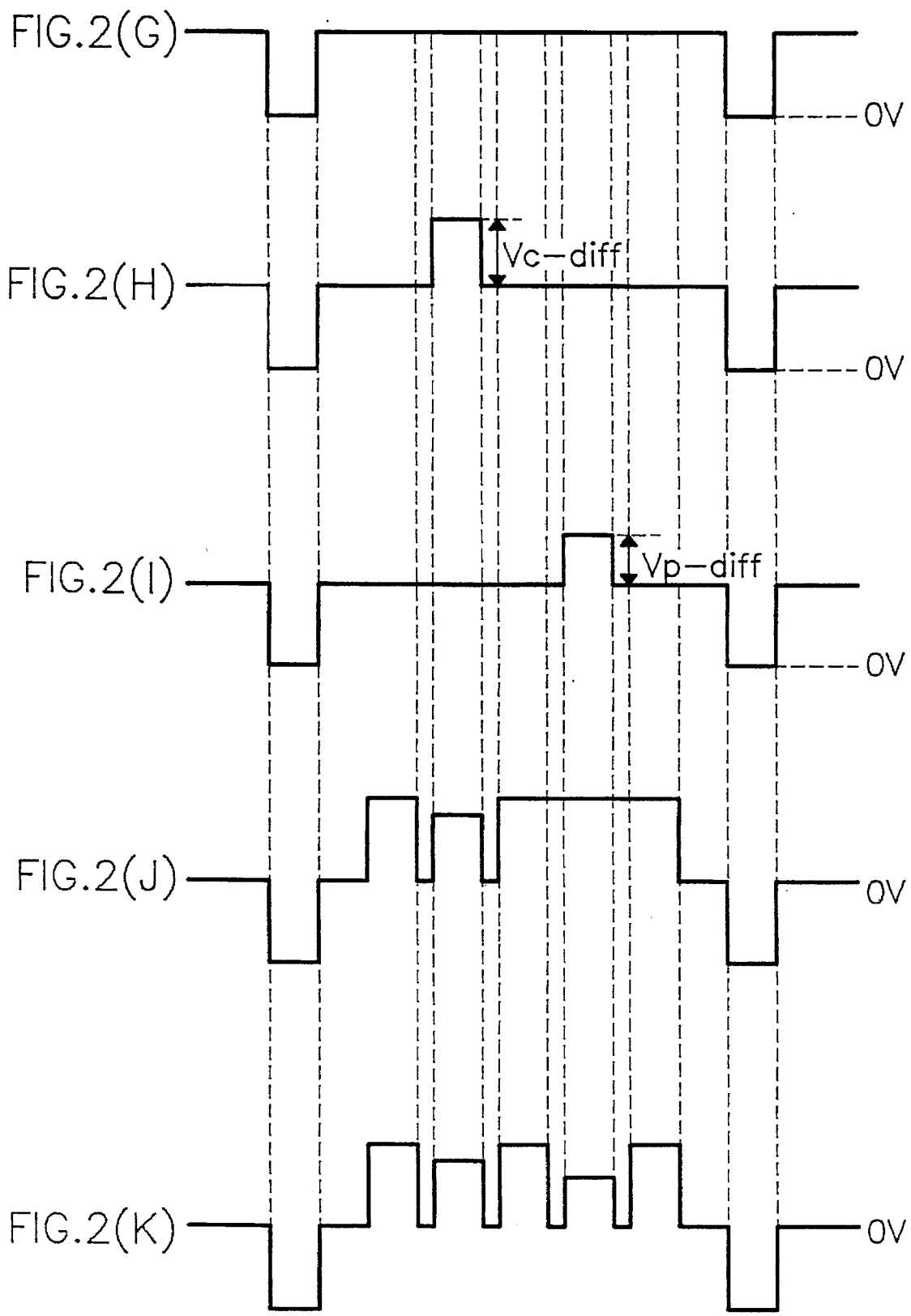

CHARACTER AND PATTERN MIXING APPARATUS FOR USE IN A VIDEO EQUIPMENT

FIELD OF THE INVENTION

The present invention relates to a video mixing apparatus for use in a video equipment; and, more particularly, to an apparatus capable of controlling luminance levels of a character and a pattern to be displayed on a screen.

DESCRIPTION OF THE PRIOR ART

A conventional video equipment, e.g., a video cassette recorder or a video camera, employs a character and a pattern mixing circuits in order to display a character and a pattern at a specific position on a screen.

However, in the conventional video recording system employing the character and the pattern mixing circuits, it is difficult to alter luminance levels of the character signal and the pattern signal since the luminance levels thereof are intrinsically set by an integrated circuit incorporated in the system to provide the character and the pattern signals.

SUMMARY OF THE INVENTION

It is, therefore, a primary object of the present invention to provide an improved apparatus for use in a video equipment capable of controlling the luminance level of a character and a pattern to be displayed on a screen.

In accordance with the present invention, there is provided a video mixing apparatus for use in a video equipment for providing a mixed image luminance signal, wherein an input video signal of the video equipment includes an image luminance signal, which comprises: a synchronization ("sync") separator for providing inverted horizontal, vertical and composite sync signals from the image luminance signal; means for generating a character/pattern selection signal; a character/pattern controller responsive to the inverted horizontal and vertical sync signals, for generating a character luminance signal and a pattern luminance signal, and a character control and a pattern control signals corresponding to the character/pattern selection signal; a character mixer for mixing the inverted composite sync signal with the character luminance signal to produce a mixed character signal; a pattern mixer for mixing the inverted composite sync signal with the pattern luminance signal to produce a mixed pattern signal; and means for mixing the mixed character signal and the mixed pattern signal with the image luminance signal in response to the character control signal and the pattern control signal to thereby provide the mixed image luminance signal.

BRIEF DESCRIPTION OF THE DRAWINGS

The above an other objects and features of the present invention will become apparent from the following description of preferred embodiments given in conjunction with the accompanying drawings, in which:

FIGS. 2(A) to 2(K) represent signal waveforms generated by the inventive apparatus.

DETAILED DESCRIPTION OF THE PREFERRED EMBODIMENTS

Figure 1:
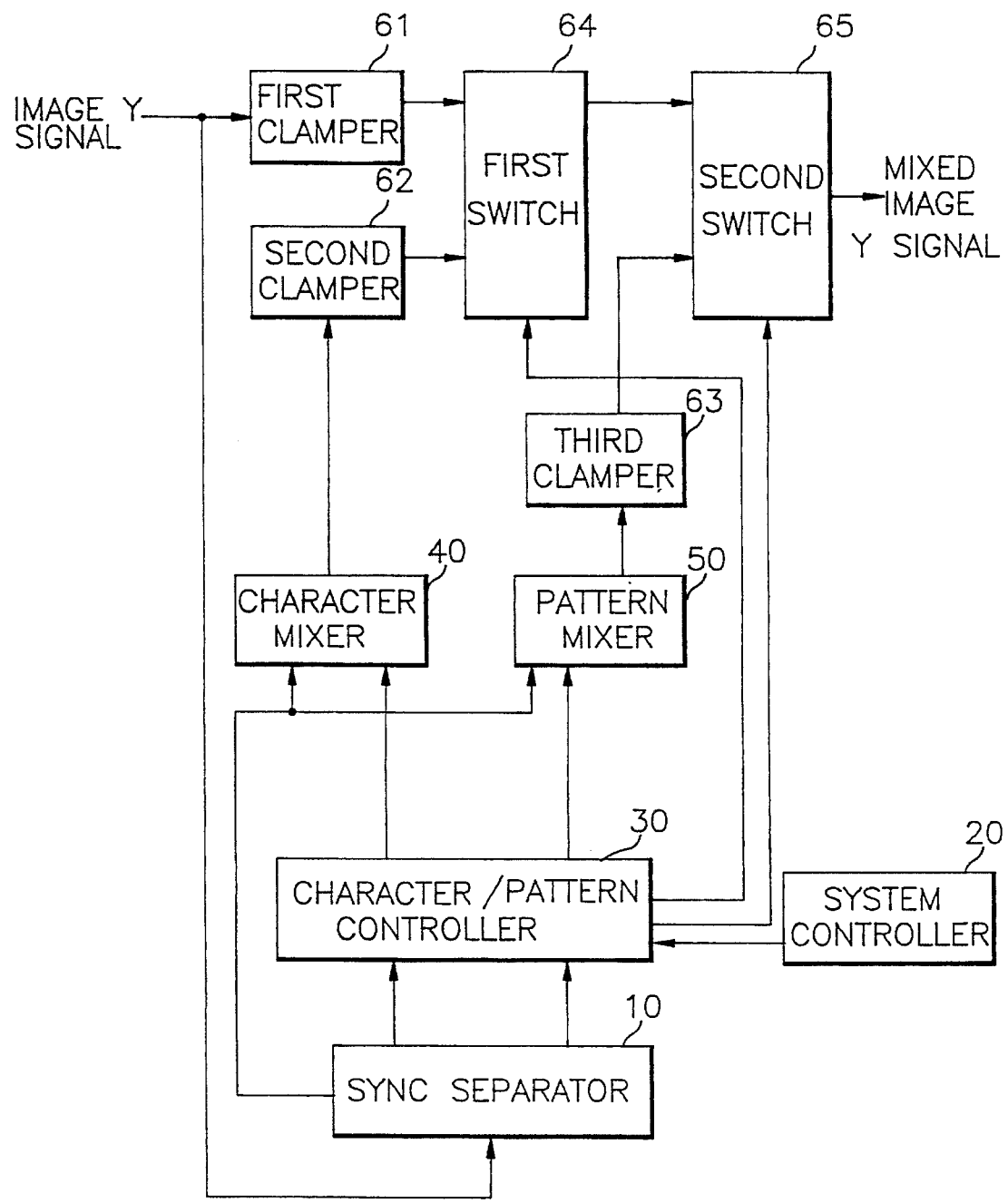
FIG. 1 shows a block diagram of a character and pattern mixing apparatus capable of mixing a character luminance signal and a pattern luminance signal with an image luminance signal in accordance with the invention.

Referring to FIG. 1, there is shown a block diagram of a character and pattern mixing apparatus, for use in a video equipment, e.g., video camera and video cassette recorder, capable of mixing a character and a pattern with an image represented by a luminance ("Y") signal.

The image Y signal having a composite synchronization ("sync") signal, as shown in FIG. 2(A), is provided to a first clamper 61 and a sync separator 10. The first clamper 61 serves to clamp the image Y signal by setting, e.g., a sync tip DC level of the composite sync signal to a predetermined level. The clamped image Y signal from the first clamper 61 is provided to a first switch 64.

In the meanwhile, the sync separator 10 inverts the image Y signal and separates a horizontal sync and vertical sync signals and the composite sync signal from the inverted image Y signal. The inverted composite sync signal, shown in FIG. 2(B), is provided to a character mixer 40 and a pattern mixer 50, while the horizontal sync and vertical sync signals are provided to a character/pattern controller 30.

In response to a character/pattern selection signal indicative of the information on a character and a pattern to be displayed on a screen, e.g., their positions, sizes and the like, from a system controller 20, the character/pattern controller 30 determines the positions of the character and the pattern on the screen by counting the number of the horizontal sync and the vertical sync signals to thereby provide a character Y signal and a pattern Y signal, as shown in FIGS. 2(C) and 2(D), to the character mixer 40 and the pattern mixer 50, respectively. Further, the character/pattern controller 30 serves to provide a character Y control and a pattern Y control signals, as shown in FIGS. 2(E) and 2(F), to the first switch 64 and a second switch 65, respectively.

The character mixer 40 serves to mix the inverted composite sync signal, shown in FIG. 2(B), from the sync separator 10 with the character Y signal, shown in FIG. 2(C), from the character/pattern controller 30 to thereby provide a mixed character Y signal, as shown in FIG. 2(H), to a second clamper 62. And, the pattern mixer 50 serves to mix the inverted composite sync signal from the sync separator 10 with the pattern Y signal applied from the character/pattern controller 30 to thereby provide a mixed pattern Y signal, as shown in FIG. 2(I), to a third clamper 63. A detailed description on the operation of the character mixer 40 and the pattern mixer 50 will be given with reference to FIGS. 3(A) and 3(B).

Figure 3A:
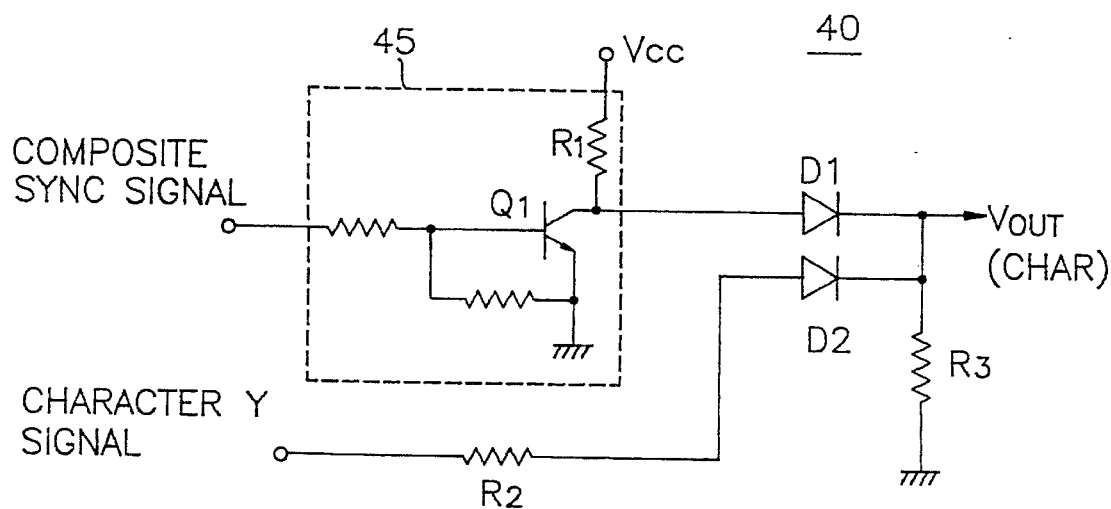
FIGS. 3(A) to 3(B) illustrate in detail the character and the pattern mixers shown in FIG. 1.
Figure 3B:
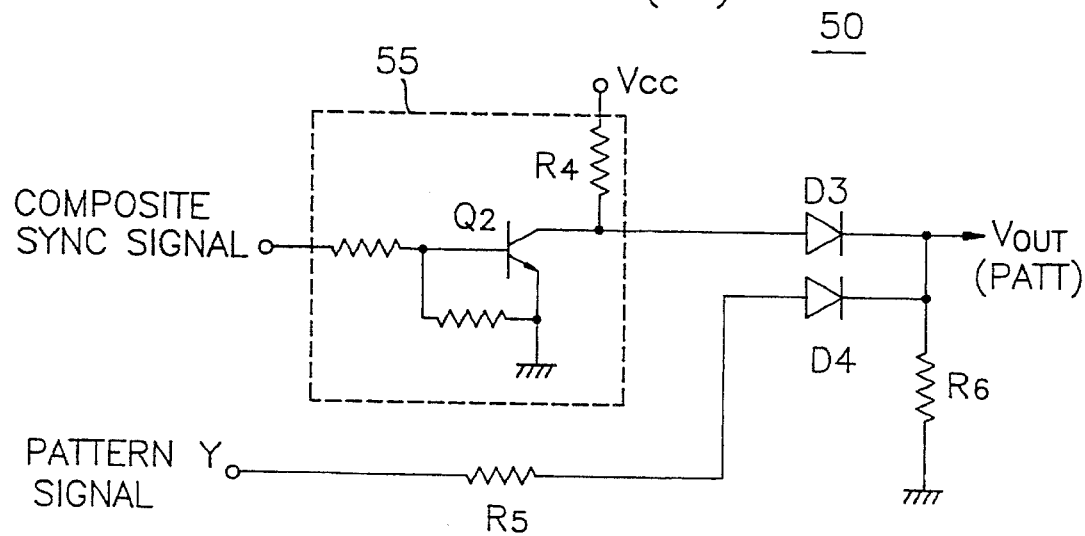

Referring now to FIGS. 3(A) and 3(B), there are shown detailed circuit diagrams of the character mixer 40 and the pattern mixer 50.

The character mixer 40 comprises an inverter circuit 45, having a transistor Q1 and a resistor $R_1$, for inverting the phase of the inverted composite sync signal $V_{sync}$, shown in FIG. 2(B), applied from the sync separator 10, a first diode D1 for receiving the inverted composite sync signal from the inverter circuit 45, a second diode D2 for receiving the character Y signal $V_{char}$, shown in FIG. 2(C), through a resistor $R_2$ and a resistor $R_3$ for coupling output terminals of the diodes D1 and D2 to ground. The output signal from the inverter circuit 45 is shown in FIG. 2(G). In a preferred embodiment of the invention, resistance of the resistor $R_1$ is greater than that of the resistor $R_2$ so that the mixed character Y signal is determined by either a reference voltage $V_{cc}$ applied to the inverter circuit 45 or the character Y signal $V_{char}$.

In accordance with the above configuration of the character mixer 40, the mixed character Y signal $V_{out}(char)$ of the character mixer 40 may be represented as:

$V_{out}(char) = 0$, if $V_{char} = 0$ and $V_{sync} > 0$ $$= \frac{R_3}{R_1 + R_3} (V_{cc} - 0.7\ V),\ \text{if}\ V_{char} = 0\ \text{and}\ V_{sync} = 0 \qquad \text{Eq. (1)}$$

$$= \frac{R_3}{R_2 + R_3} (V_{char} - 0.7\ V),\ \text{if}\ V_{char} > 0\ \text{and}\ V_{sync} = 0 \qquad \text{Eq. (2)}$$

wherein 0.7 V is a voltage drop for the diodes D1 and D2.

The luminance level of the character $V_{c\text{-}diff}$ is determined from Eqs. (1) and (2) as:

$$V_{c\text{-}diff} = \frac{R_3}{R_2 + R_3}(V_{char} - 0.7\ V) - \frac{R_3}{R_1 + R_3}(V_{cc} - 0.7\ V) \qquad \text{Eq. (3)}$$

Therefore, it will be appreciated from Eq.(3) that the luminance level of the character to be displayed on the screen is determined by the combination of resistors $R_1$ to $R_3$, $V_{char}$ and $V_{cc}$. The mixed character Y signal $Y_{out}(char)$ from the character mixer 40, as shown in FIG. 2(H), is provided to a second clamper 62.

Similarly, as shown in FIG. 3(B), the pattern mixer 50 comprises an inverter circuit 55, having a transistor Q2 and a resistor R4, for inverting the phase of the inverted composite sync signal $V_{sync}$, a third diode D3 for receiving the inverted composite sync signal from the inverter circuit 55, a fourth diode D4 for receiving the pattern Y signal $V_{patt}$ through a resistor $R_5$ and a resistor $R_6$ for coupling output terminals of the diodes D3 and D4 to ground. The output signal from the inverter circuit 55 is shown in FIG. 2(G). In the preferred embodiment of the invention, resistance of the resistor $R_4$ is greater than that of the resistor $R_5$ so that the mixed pattern Y signal is determined by either the reference voltage $V_{cc}$ applied to the inverter circuit 55 or the pattern Y signal $V_{patt}$.

In accordance with the above configuration of the pattern mixer 50, the mixed pattern Y signal $V_{out}(patt)$ from the pattern mixer 50 is represented as:

$V_{out}(patt) = 0$, if $V_{patt} = 0$ and $V_{sync} > 0$ $$= \frac{R_6}{R_4 + R_6}(V_{cc} - 0.7\ V),\ \text{if}\ V_{patt} = 0\ \text{and}\ V_{sync} = 0 \qquad \text{Eq. (4)}$$

$$= \frac{R_6}{R_5 + R_6}(V_{patt} - 0.7\ V),\ \text{if}\ V_{patt} > 0\ \text{and}\ V_{sync} = 0 \qquad \text{Eq. (5)}$$

wherein, 0.7 V is a voltage drop for the diodes D3 and D4.

The luminance level of the pattern $V_{p\text{-}diff}$ is determined from Eqs. (4) and (5) as:

$$V_{p\text{-}diff} = = \frac{R_6}{R_5 + R_6}(V_{patt} - 0.7\ V) - \frac{R_6}{R_4 + R_6}(V_{cc} - 0.7\ V) \qquad \text{Eq. (6)}$$

From the above equation, it will be appreciated that the luminance level of the pattern to be displayed on the screen is determined by $R_4$ to $R_6$, $V_{patt}$ and $V_{cc}$. The mixed pattern Y signal $V_{out}(patt)$ from the pattern mixer 50, as shown in FIG. 2(I), is provided to a third clamper 63.

The second clamper 62 serves to clamp the mixed character Y signal $V_{out}(char)$ by setting, e.g., the sync tip DC level of the composite sync signal included in $Y_{out}(char)$ to the predetermined level, thereby allowing the mixed character Y signal $V_{out}(char)$ to have a same reference level as the one of the clamped image Y signal, shown in FIG. 2(A), from the first clamper 61. The resultant output is provided to the first switch 64.

The first switch 64 serves to select the clamped image Y signal and the mixed character Y signal clamped by the second clamper 62 in response to the character Y control signal, shown in FIG. 2(E), from the character/pattern controller 30. The first switch 64 selects, during the duration of a logic high level of the character Y control signal, the mixed character Y signal clamped by the second clamper 62; and selects the clamped image Y signal from the first clamper 61 during the duration of a logic low level of the character Y control signal. The selected signals are then generated as an output signal to the second switch 65. FIG. 2(J) shows the output signal from the first switch 64.

In the meantime, the third clamper 63 serves to clamp the output signal from the pattern mixer 50. The resultant output of the third clamper 63 is applied to the second switch 65.

The second switch 65 serves to select the output signals from the first switch 64 and the third clamper 63 in response to the pattern Y control signal from the character/pattern controller 30. The second switch 65 generates, as an output signal, the mixed pattern Y signal clamped by the third clamper 63 during the duration of a logic high level of the pattern Y control signal, shown in FIG. 2(F), from the character/pattern controller 30; and generates the output signal, shown in FIG. 2(J), from the first switch 64 during the duration of a logic low level of the pattern Y control signal to thereby provide a mixed image Y signal as shown in FIG. 2(K).

While the present invention has been shown and described with reference to the particular embodiments, it will be apparent to those skilled in the art that many changes and modifications may be made without departing from the spirit and scope of the invention as defined in the appended claim.

What is claimed is:

1. A video mixing apparatus for use in a video equipment for providing a mixed image luminance signal, wherein an input video signal of the video equipment includes an image luminance signal, which comprises, a synchronization ("sync") separator for providing inverted horizontal sync, inverted vertical sync and inverted composite sync signals from the image luminance signal;

means for generating a character and pattern selection signal;

a character/pattern controller, responsive to the inverted horizontal and vertical sync signals, for generating a character and a pattern luminance signals, and a character control signal and a pattern control signal corresponding to the character and pattern selection signal;

a character mixer for mixing the inverted composite sync signal with the character luminance signal to produce a mixed character signal;

a pattern mixer for mixing the inverted composite sync signal with the pattern luminance signal to produce a mixed pattern signal; and means for mixing the mixed character signal and the mixed pattern signal with the image luminance signal in response to the character control signal and the pattern control signal to thereby provide the mixed image luminance signal.

* * * * *